United States Patent
Fischedick et al.

(10) Patent No.: US 7,236,809 B2
(45) Date of Patent: Jun. 26, 2007

(54) LOGGING IN OF BATTERY-OPERATED MOBILE PARTS AT BASE STATIONS WITH A BATTERY CHARGING DEVICE

(75) Inventors: Thomas Fischedick, Raesfeld (DE); Dominic Heynen, Hamminkeln (DE); Frank Peter Holtmann, Dortmund (DE); Uwe Ober, Steinfurt (DE); Peter Scholz, Bocholt (DE); Jens Vieregge, Unna (DE); Martin Zavelberg, Köln (DE)

(73) Assignee: Siemens Aktiengesellschaft, Munich (DE)

( * ) Notice: Subject to any disclaimer, the term of this patent is extended or adjusted under 35 U.S.C. 154(b) by 413 days.

(21) Appl. No.: 10/482,346

(22) PCT Filed: Jun. 28, 2002

(86) PCT No.: PCT/DE02/02355

§ 371 (c)(1),
(2), (4) Date: Feb. 6, 2004

(87) PCT Pub. No.: WO03/003702

PCT Pub. Date: Jan. 9, 2003

(65) Prior Publication Data

US 2004/0185917 A1  Sep. 23, 2004

(30) Foreign Application Priority Data

Jun. 28, 2001  (DE)  ................ 101 31 206

(51) Int. Cl.
*H04B 1/38* (2006.01)
*H04M 1/00* (2006.01)

(52) U.S. Cl. ................ 455/573; 455/343.1; 455/435.1; 320/106; 320/107

(58) Field of Classification Search ................ 455/573, 455/127.1, 343.1, 435.1, 462, 572, 574; 320/106–115
See application file for complete search history.

(56) References Cited

U.S. PATENT DOCUMENTS 5,495,520 A * 2/1996 Kojima ........................ 379/62
5,640,680 A 6/1997 Ishida et al.
5,844,884 A * 12/1998 Szlenski ..................... 370/149

(Continued)

FOREIGN PATENT DOCUMENTS

DE  197 40 934  4/1999

(Continued)

*Primary Examiner*—Lana Le
*Assistant Examiner*—Tuan H. Nguyen
(74) *Attorney, Agent, or Firm*—Bell, Boyd & Lloyd LLP

(57) ABSTRACT

In order to improve the logging in of battery-operated mobile parts (MT) in base stations (BS) with a battery charging device (ALE) in telecommunications systems for wireless telecommunication so that a log-in standby state between the mobile part (MT) which is logging in and the base station (BS) can be automatically produced without the user of the telecommunications system having to execute existing described procedures, said log-in standby for a battery operated mobile part (MT) in a base station (BS) with a battery charger in a telecommunications network for wireless telecommunication is produced by means of charging contacts (LK1-M, LK2-M, LK1-B, LK2-B) of the mobile part (MT) and base station (BS), whereupon the log-in procedure is carried out via the aerial interface of the telecommunications system.

21 Claims, 6 Drawing Sheets

Figure 1:
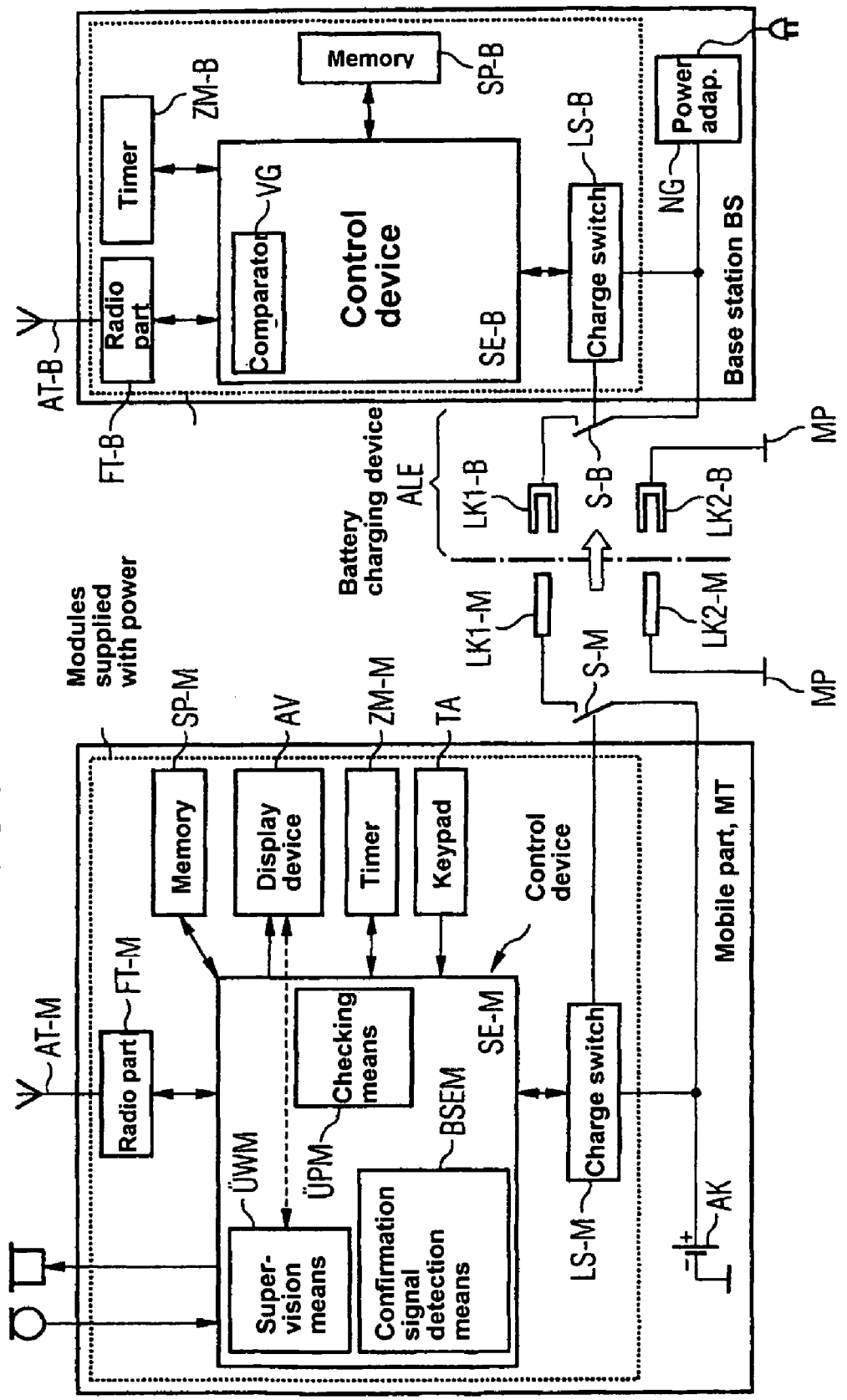

U.S. PATENT DOCUMENTS 5,870,685 A * 2/1999 Flynn .................. 455/573

FOREIGN PATENT DOCUMENTS

| | | |
|---|---|---|
| DE | 100 00 963 | 8/2001 |
| EP | 0 667 078 | 8/1995 |
| GB | 2 124 454 | 2/1994 |
| WO | WO 99/31859 | 6/1999 |

* cited by examiner

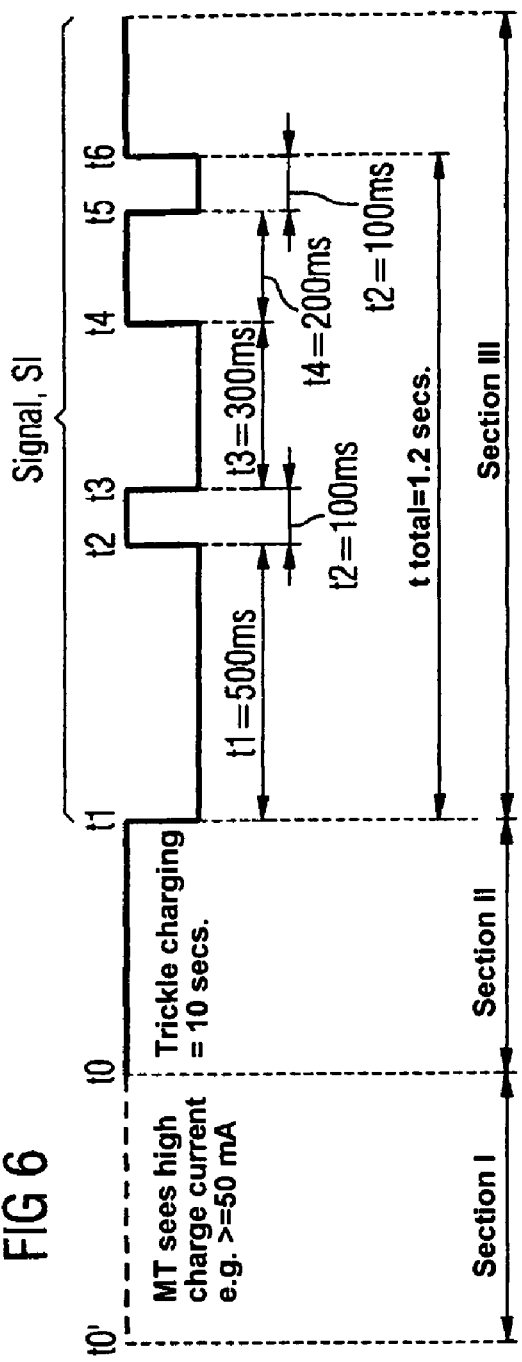
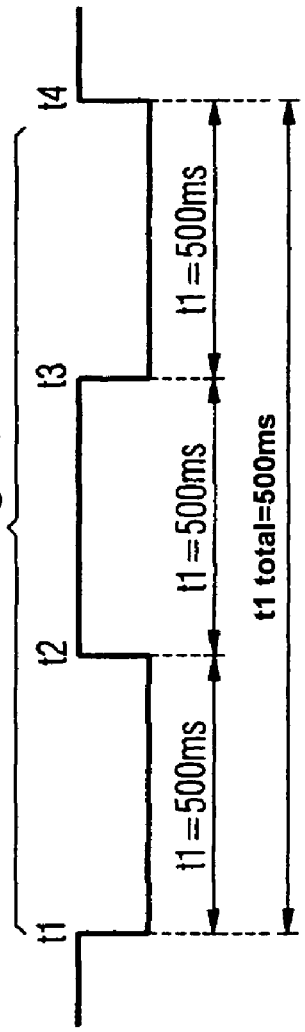

LOGGING IN OF BATTERY-OPERATED MOBILE PARTS AT BASE STATIONS WITH A BATTERY CHARGING DEVICE

The invention relates to a method for registration of battery-operated mobile parts at base stations with a battery charging device of telecommunications systems for wireless telecommunications in accordance with the preamble of patent claim 1, to a battery-operated mobile part for registering at a base station with a battery charging device of telecommunications systems for wireless telecommunications in accordance with the preamble of patent claim 9 and to a telecommunications system for wireless telecommunications consisting of a base station with a battery charging device and a battery-operated mobile part, for registering the battery-operated mobile part at the base station in accordance with the preamble of patent claim 15.

Telecommunications systems for cordless telecommunication, each consisting of at least one base station with a battery charging device and of at least one battery-operated mobile part, are typically cordless telecommunications systems with which on the one hand mobile telephone calls can be made over short distances over the fixed network, e.g. the ISDN or PSTN or local and long-distance calls—can be made—that is speech data and on the other hand packet data, e.g. SMS messages, can be transmitted or exchanged. In addition, in the foreseeable future there will be cordless telecommunications systems that are suitable for the transmission of speech or packet data over the Internet. For this reason there will still be a worldwide market for such cordless telecommunications systems, despite the worldwide dominance of the mobile telephones (GSM handsets or soon UMTS handsets) in the future, that could perhaps even become greater, especially against the background of current discussions about WLAN or IEEE802.11 application scenarios. The protocol which is currently the most widespread, at least in Europe, on which such cordless telecommunications systems are based, is the DECT protocol So that wireless mobile telecommunications can also be operated from such cordless telecommunications systems consisting of two devices (base station and mobile part), the two devices must be "married" to one another. This occurs by the mobile part being registered at the base station. The way in which this type of registration procedure operates, especially for DECT-specific cordless telecommunications systems, is described in detail in EP 0 667 078 B1. During such a registration procedure or also in advance of the registration procedure, establishing the ready-to-register condition, the user of the cordless telecommunication system has always had to perform some activity such as entering a personal identification number or PIN, or selecting an internal number for the mobile part or switching the base station to ready-to-register by pressing a registration key. These measures are not very user friendly, so the manufacturers of such cordless telecommunications systems have already incorporated them during the manufacturing process. Although this improves the user-friendliness for the purchasers of such cordless telecommunications systems, it also increases the costs of manufacturing the systems.

So now, in order not to have to do the latter (increase the manufacturing costs), without having neglected the former (improving the user friendliness), the procedure for automatically registering a mobile part at a base station is known from DE 100 00 963 A1. So for initial registration of the mobile part at the base station the readiness to register of the base station is established. There is then provision for a synchronous or quasi-synchronous operating event between the base station and the mobile part to serve to establish an operating reference point of the base station and the mobile part in each case, for the operating reference points to be compared with each other and for the base station to accept the registering mobile part if the difference (At) of the operating reference points lies within a specifiable range.

This makes it possible to register the mobile part automatically at the base station, which means without having to make any entry on the control panel for the actual registration procedure. So that a common reference point is determined, the automatic registration is also protected, meaning that an unauthorized mobile part cannot simply be registered at the base station, since this mobile part does not possess any common reference point with this base station. The common operating reference point can only be determined between a base station and a mobile part for which the operating event occurs synchronously or quasi-synchronously A synchronous operating event is taken to mean an event during a registration that occurs simultaneously both at the base station and also inclusively on the mobile part. A synchronous operating event can for example be the activation of an energy supply device shared by the base station and the mobile part.

The underlying object of the invention consists of greatly improving the registration of battery-operated mobile parts at base stations with a battery charging device of telecommunications systems for cordless telecommunications, so that the required readiness to register between the mobile part and base station to be registered is automatically established without the user of the telecommunication system needing to execute the measures described previously in this document.

Starting with method defined in the preamble of patent claim 1, this object is achieved by the features specified in the characterizing parts of patent claim 1. In addition the object will be achieved, starting from the battery-operated mobile part defined in the preamble of patent claim 9, by the features specified in the characterizing parts of patent claim 9.

In addition the object is achieved, starting from the telecommunications system defined in the preamble of patent claim 15, by the features specified in the characterizing parts of patent claim 15.

The idea underlying the invention consists of establishing the readiness to register of a battery-operated mobile part at a base station with a battery charging device of a telecommunications system for cordless telecommunications via charging contacts of the mobile part and the base station and then letting the registration procedure run as normal via the air interface of the telecommunications system.

By contrast with the technical teaching known from DE 100 00 963 A1, it is no longer necessary, in accordance with the invention teaching, to have a synchronous or quasi-synchronous operating event between mobile part and base station in order to determine a common operating reference point. With the teaching in accordance with the invention, the user of the telecommunications system can just connect the base station to the power network and then at some other time (and not as with the known teaching essentially at the same time) supply the mobile part with power, e.g. by placing it in the battery charging device. This enables the user-friendliness of telecommunications systems of the type mentioned at the beginning of this document to be improved further.

Advantageous developments of the invention are specified in the subclaims.

The development of the invention in accordance with claims 2 to 4, claims 10 and 11 as well as claims 16 and 17, to create time stamps in the mobile part and base station and to then compare these, has the advantage of then guaranteeing the unique assignment of base station and mobile part. This further avoids the possibility of two mobile parts registering crossed at two base stations. Each base station and each mobile part have an identical time stamp. In addition the mobile part is almost certain to be registered at the correct base station.

The development of the invention in accordance with claim 7, claim 13 as well as claim 20, recording the charge current on the basis of actual values and comparing the actual values with a required value, offers the advantage that, if the base station is handling at least one active connection between a mobile part and an external telecommunications subscriber (e.g. incoming or outgoing call) while another mobile part wishes to register, the active connection will be prioritized.

The development of the invention in accordance with claim 8, claim 14 as well as claim 21, ensuring that the display is idle—that is that the device displays do not change as a result of keypad entries, contributes in an advantageous way to the fact that if users should be playing on the keypad, they will not be confused by the parallel automatic registration with the resulting changes of display or might even think that the device is defective.

Further advantageous developments are specified in the subclaims.

Figure 2:
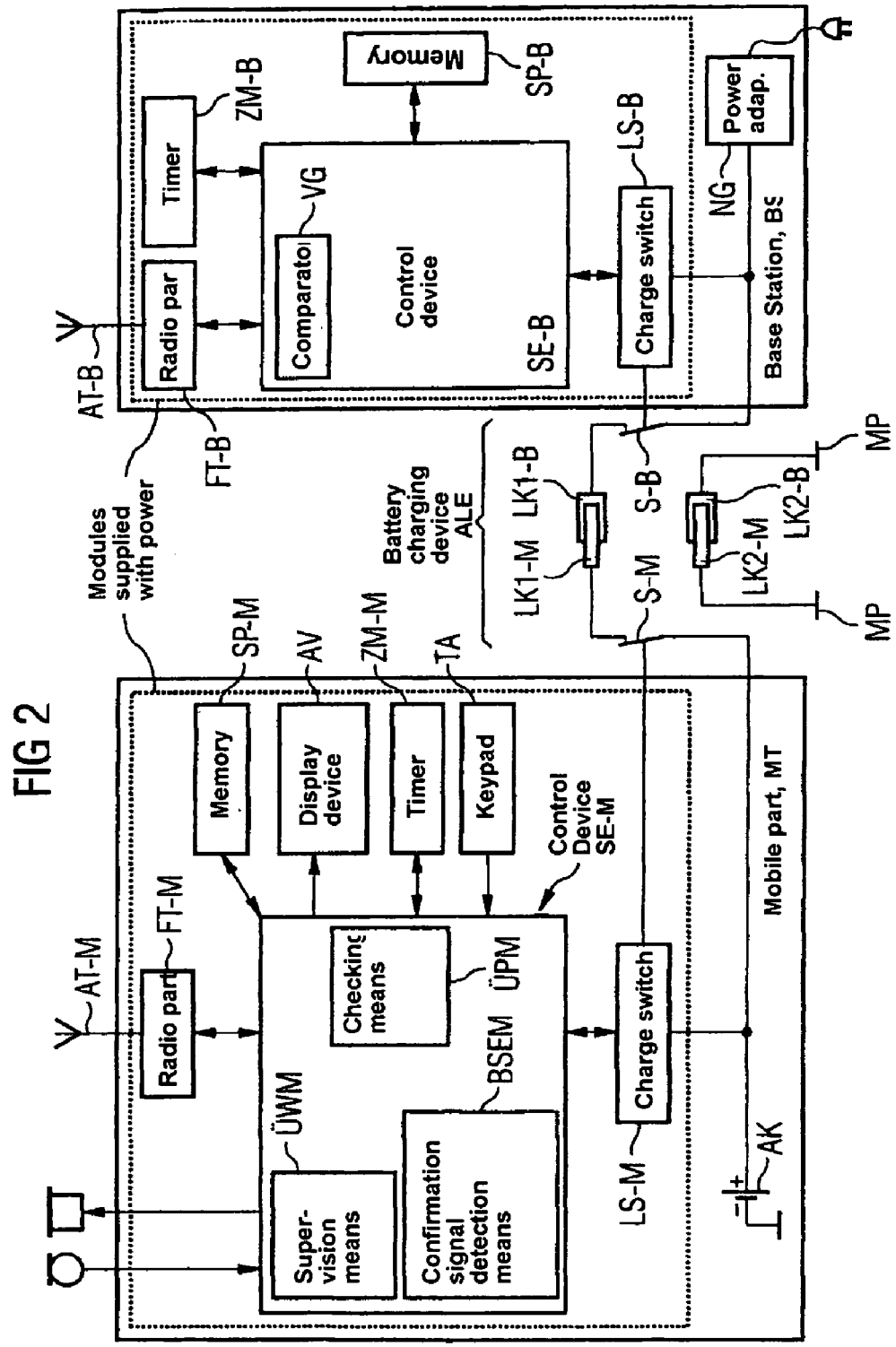
Figure 3:
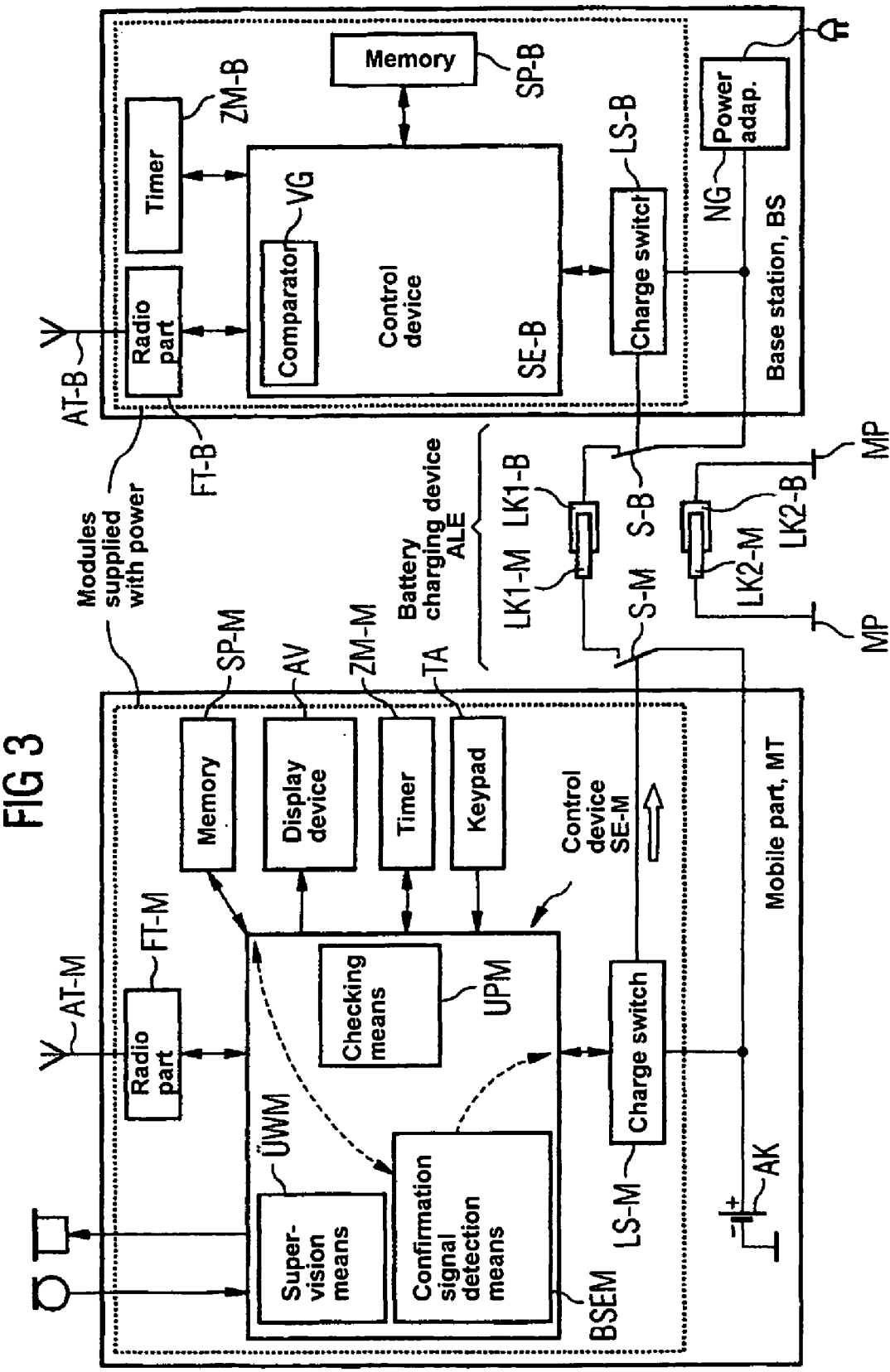
Figure 4:
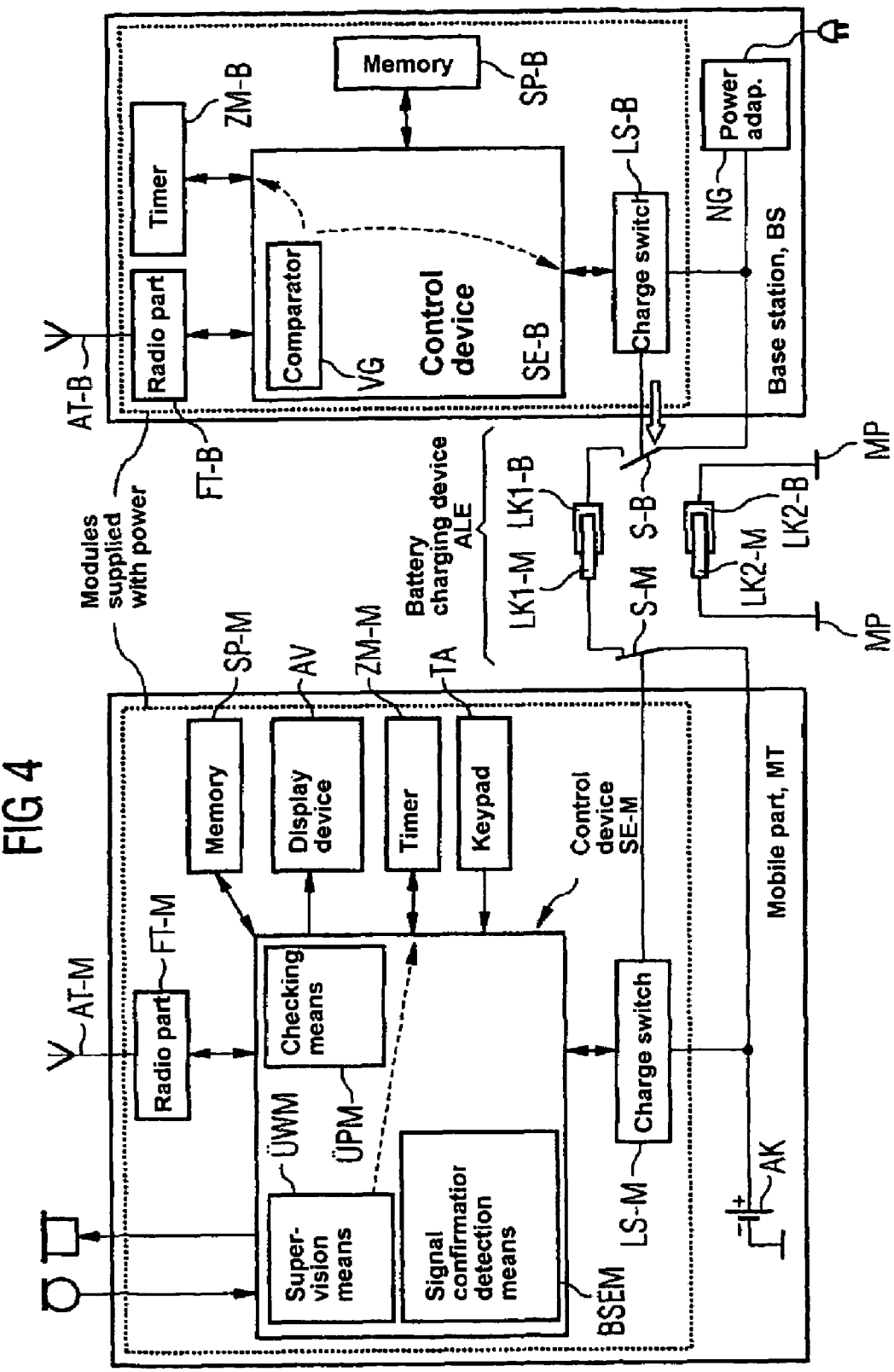
Figure 5:
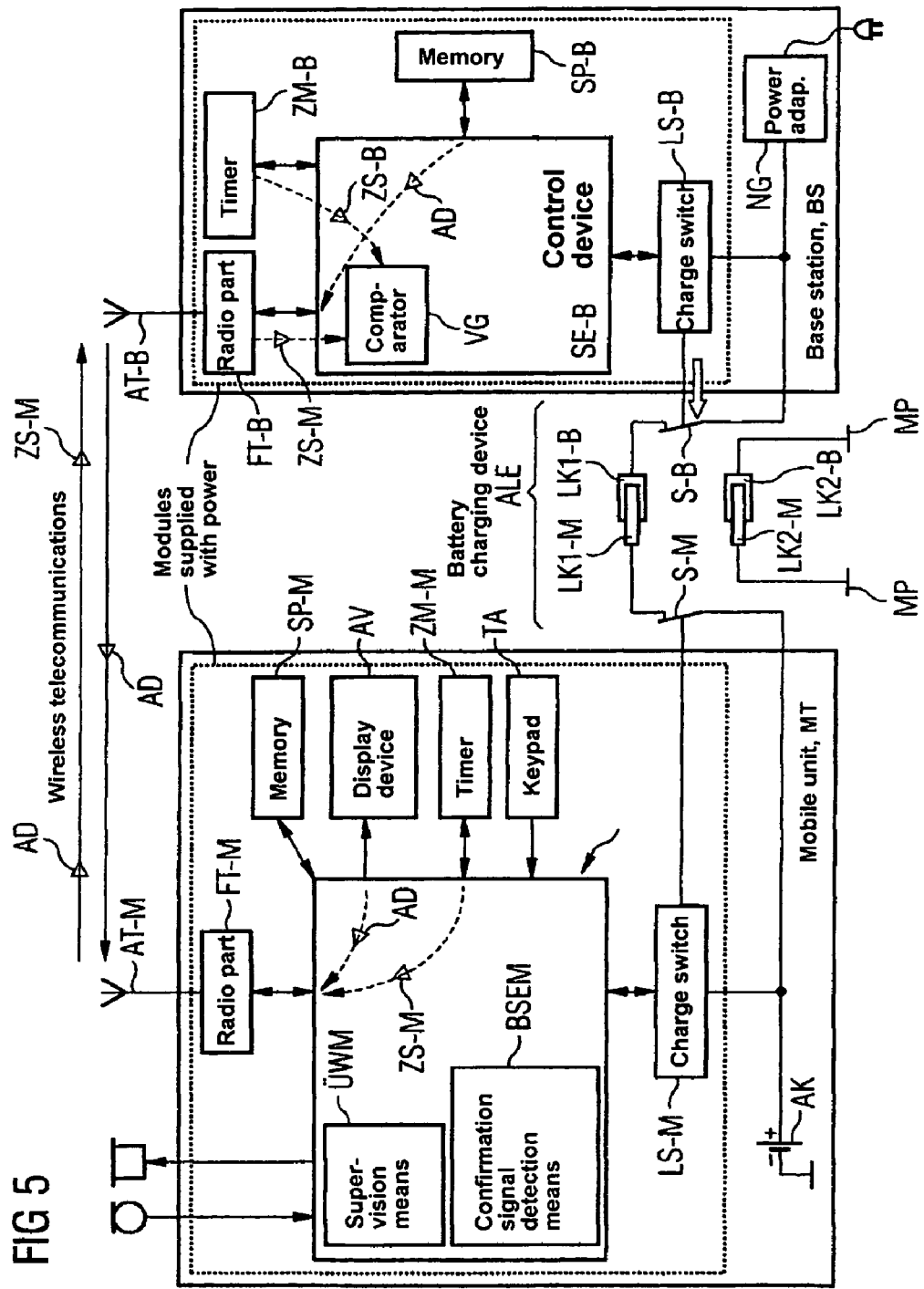

An exemplary embodiment of the invention is explained on the basis of FIGS. 1 to 7. The diagrams show:

FIG. 1 A basic block diagram of a battery-operated mobile part and a base station with a battery-charging device, in which the mobile part is not yet introduced into the battery charging device, FIG. 2 A basic block diagram of a battery-operated mobile part and a base station with a battery-charging device, in which the mobile part is introduced into the battery-charging device and trickle charging of the mobile part is taking place, FIG. 3 Basic block diagram of a battery-operated mobile part and a base station with a battery-charging device, in which the mobile part is introduced into the battery-charging device and notifies the base station that it is ready to register, FIG. 4 Basic block diagram of a battery-operated mobile part and a base station with a battery-charging device, in which the mobile part is introduced into the battery-charging device and the base station notifies the mobile that its is ready to register FIG. 5 Basic block diagram of a battery-operated mobile part and a base station with a battery-charging device, in which the mobile part is introduced into the battery-charging device and the ready-to-register state is established between mobile part and base station.

FIG. 6 Sequence of signals controlled by the mobile part at the charging contacts in the battery-charging device with mobile part introduced into it FIG. 7 Sequence of signals controlled by the base station at the charging contacts in the battery-charging unit with the mobile part introduced into it.

FIG. 1 shows the basic block diagram of a cordless telecommunications system for wireless telecommunications consisting of a battery-operated mobile part MT and a base station BS with a battery-charging unit ALE. The battery-charging unit ALE consists of holder for the battery-operated mobile part MT, when the latter is introduced into the battery-charging unit ALE to charge the battery AK in the mobile part MT. In the area where the charging of the mobile battery is to take place the holder features two charging contacts, assigned to the base station BS, a first charging contact LK1-B and a second charging contact LK2-B. The charging contacts LK1-B, LK2-B are connected to base station BS via a first switch S-B, which can be opened and closed again by the first charge switch LS-B in the base station BS. Charge switch LS-B and switch S-B form a switching device of the base station BS. Whereas the charging contacts LK1-B, LK2-B are shown in FIG. 1, the holder is not shown since it is not inherently important for the invention to be described.

If mobile part MT is now introduced into battery-charging unit ALE, in which case the introduction, depending on the embodiment of the holder, can be for example horizontal laying, a vertical placing or an angled (partly vertical and partly horizontal) laying or placing action,—this is shown in FIG. 1 by the arrow—then two charge contacts assigned to the mobile part MT, a first charge contact LK1M and a second charge contact LK2-M are connected to the charge contacts LK1-B, LK2-B assigned to the base station BS. This state is shown in FIGS. 2 to 5. The charging contacts LK1-M, LK2-M are connected to mobile part MT via a second switch S-M, which can be opened and then closed again by a second charge switch LS-M in the mobile part MT. Charge switch LS-M and switch S-M form a switching device of the mobile part MT.

So that the battery AK in the mobile part MT can now be charged, it is connected via the switch S-M on the mobile part side to the charging contacts LK1-M while on the base station side an AC adapter NG is connected via switch S-B to the charging contact LK1-B. The charging contacts LK2-M, LK2-B, in order to produce a charging circuit at all, each have a connection to ground potential MP.

The battery AK in the mobile part MT is normally charged when the latter is to be put into operation for the first time, since in the "virgin" status (as delivered) it is normally empty, or when the energy taken out by using battery AK is to be replaced, meaning that battery AK is to be recharged. Battery AK supplies all the current-consuming modules of the mobile part MT with energy or current. These modules, in accordance with the basic block diagram shown in FIG. 1, include, in addition to the already-mentioned charge switch LS-M, a first control device SE-M, a first radio part FT-M, a first memory SP-M, a display unit AV, a first timer ZM-M and a keypad TA. The last-mentioned device is naturally only a consumer of current when keypad TA includes illuminated keys. These named modules are thus shown grouped together in FIG. 1 surrounded by a dotted outline. The list of boards, components, modules or units enumerated and shown is naturally not definitive. The mobile part certainly contains further boards, components, modules or units, but these are not inherently important for the invention and are thus also not shown. The boards, components, modules or units named are connected to each other in the way shown and are connected to battery AK.

The control device SE-M in accordance with FIG. 1 includes monitoring means ÜWM, checking means ÜPM and confirmation signal detection means BSEM for which the importance for the exemplary embodiment of the invention will be explained further on in this document (in the case of the monitoring means ÜWM, in the course of the description of FIG. 1, in the case of the checking means ÜPM, in the course of the description of FIG. 2 and in the case of the confirmation signal detection means BSEM, in the course of the description of FIGS. 4 and 5). In addition the control device SE-M—as shown in FIG. 1—is connected to a microphone MF and an earpiece HK.

For wireless telecommunications of mobile part MT with the base station BS the radio part FT-M is connected to a first antenna AT-M.

To supply current or energy, base station BS, unlike mobile part MT, is not fed by a battery, but by the ac power adapter already mentioned. The power adapter NG supplies all the consumer boards of the base station BS with energy or current. These modules, in accordance with the basic block diagram of a base station shown in FIG. 1, include, in addition to the already-mentioned charge switch LS-B, a second control device SE-B, a second radio part FT-B, a second memory SP-B and a second timer ZM-B. These named modules are thus again shown grouped in FIG. 1 surrounded by a dotted outline. The list of boards, components, modules or units enumerated and shown is naturally not definitive. The base station certainly contains further boards, components, modules or units, but these are not inherently important for the invention and are thus also not shown. The boards, components, modules or units named are connected to each other in the way shown and are connected to the power adapter NG.

The control device SE-B, in accordance with FIG. 1 contains a comparator VG for which the importance for the exemplary embodiment of the invention will be explained further on in the course of the description of FIG. 5.

For wireless telecommunications between the base station BS and the mobile part MT the radio part FT-B is connected to a second antenna AT-B.

The object of the exemplary embodiment of the invention is the registration of battery-operated mobile parts at base stations with a battery charging device of telecommunications systems for cordless telecommunications. This process can basically be divided into two phases:

Phase 1: Establishing the ready-to-register state of mobile part MT and base station BS via the charging contacts LK1-M, LK2-M, LK1B, LK2-B, when the mobile part MT is introduced into the battery-charging unit ALE Phase 2: Performing the actual registration in a known way via the air interface of the telecommunications system Phase 1 is explained in detail on the basis of FIGS. 1 to 5 compared to FIGS. 6 and 7, whereas only a brief description of Phase 2 is entered into with the description of FIG. 5.

The first step in establishing readiness to register is, according to the definition of Phase 1, the bringing together of mobile part MT and base station BS, by introducing the mobile part MT into battery-charging unit ALE. This step, as already mentioned, is shown in FIG. 1 by the arrow. In FIGS. 2 to 5 this step is already completed. If the mobile part MT has been introduced into the battery-charging unit ALE, it is useful to clarify under some circumstances whether the mobile part MT which is in the battery-charging unit ALE is still not to be registered yet since the user is still using keys on the keypad TA while the mobile part is in the battery-charging unit ALE, which results in the displays on the display device AV changing, to perhaps try out something else on the mobile part before wishing to register it. To obtain clarity here and to not confuse the user, if as a result of automatic registration changes to the display also occur, it is advantageous to monitor whether the display unit AV is in the idle state This monitoring is carried out by the monitoring means ÜWM in the control device SE-M of the mobile part MT.

FIG. 2 shows the basic block diagram of the cordless telecommunications system for wireless telecommunications consisting of the battery-operated mobile part MT and base station BS with the battery-charging unit ALE, in which the first step to establishing readiness to register is completed and within which it must now be ensured in a second step that there is actually enough energy in the battery AK for the mobile part MT to actually perform the registration, and in a third step it must be established whether the mobile part is to be registered or only to be charged.

The battery-charging unit ALE again consists of the holder for the battery-operated mobile part MT, when the latter is introduced into the battery-charging unit ALE for charging a battery AK in the mobile part MT. The holder again features the charging contacts LK1-B, LK2-B in the area where the charging of the mobile part battery is to take place. The charging contacts LK1-B, LK2-B are connected to base station BS via the switch S-B, which can be opened and closed again by the charge switch LS-B in the base station BS. By the mobile part MT now being introduced into the battery-charging unit ALE the charging contacts LK1-M, LK2-M assigned to the mobile part MT are connected to the charging contacts LK1-B, LK2-B assigned to the base station BS. The charging contacts LK1-M, LK2-M are again connected to mobile part MT via the switch S-M, which can be opened and then closed again by the charge switch LS-M in the mobile part MT. The battery AK in the mobile part MT is again charged by the power adapter NG.

The battery AK again supplies all the consumer boards of the mobile part MT with energy or current. These boards again include, as well as the charge switch LS-M, the control device SE-M with the monitoring means ÜWM, checking means ÜPM and the confirmation signal detection means BSEM, the radio part FT-M with the antenna AT-M, the memory SP-M, The display unit AV, the timer ZM-M and the keypad TA.

To supply current or energy, the base station BS, unlike mobile part MT, is again fed by the ac power adapter NG. The power adapter NG supplies all the consumer boards of the base station BS with energy or current. These boards again include, in addition to the charge switch LS-B, the control device SE-M with the comparator VG, the radio part FT-B with the antenna AT-B, the memory SP-B and timer ZM-B.

To ensure that there is sufficient energy contained in the battery, the stored energy in the battery AK would normally have to be measured for this purpose. When battery AK is used for the first time such a check is normally redundant since battery AK is empty as a rule. In this case battery AK must at least be slightly charged so that the automatic registration can be undertaken stably on the mobile part MT side. The situation is different when the battery AK has already been used. A measurement would be appropriate here to make sure that sufficient energy is available. Since charging would have to occur in any event if the first case were to apply it makes sense to always charge the battery. This is the reason why trickle charging is undertaken preferably a certain period of preferably adjustable time t0-t1 in accordance with signal trace diagram section II in FIG. 6. During this time a charge current LST flows via the charging contacts LK1-M, LK2-M, LK1-B, LK2-B into battery AK. The period can in this case be set by software in the control device SE-M so that this then causes switching device LS-M, S-M to interrupt the connection from power adapter NG to battery AK by opening switch S-M.

For automatic registration via the charging contacts a distinction must be made between two operating states: State 1: Mobile part in the battery-charging unit ALE is a mobile part that is not yet registered at the base station BS.

State 2: Mobile part in the battery-charging unit ALE is a mobile part that is already registered but is merely in the battery-charging unit ALE for the purposes of charging the battery. To prevent only mobile parts in state 1 from being registered automatically a check must be made as to whether such as mobile part is in the battery-charging unit ALE. This is achieved by the checking means ÜPM, provided for this purpose, checking whether registration data is already stored in memory SP-M. If this is the case, the mobile part in the battery-charging unit ALE is a mobile part in state 2.

For the case where the power adapter NG used in the base station BS is not designed to supply the base station BS, at which a number of mobile parts can be operated, with enough energy for it to simultaneously perform automatic registration for a first mobile part via the charging contacts and handle an active connection for a second mobile part between this mobile part and an external telecommunications subscriber (e.g. incoming or outgoing call), it makes sense to prioritize the active connection. This is done by the control device SE-M recording via the charge switch LS-M of the switch unit LS-M, S-M an actual value of the charge current LST that is flowing in the connection between the mobile part MT and the base station BS via the charging contacts LK1-M, LK2-M, LK1-B, LK2-B and, when this actual value is less than a specified required value, e.g. 50 mA, of charge current LST, interrupting the establishment of the ready-to-register state until the actual value recorded is equal to or greater than the required value. This is shown in signal trace diagram section I by period of t0'–t0 in FIG. 6.

The prioritization presents itself at the time of execution of the two steps (second step and third step) since the charge current LST flows for the first time here at an earlier point when the ready-to-register state is established.

FIGS. 3 and 4 each show the basic block diagram of the cordless telecommunications system for wireless telecommunications consisting of the battery-operated mobile part MT and base station BS with the battery-charging unit ALE, in which the first three steps to establish the ready-to-register state are completed and in which now, in a fourth and last step for establishing the ready-to-register state, the exchange of signals for the ready-to-register state is undertaken by the mobile part and the base station.

The battery-charging unit ALE again consists of the holder for the battery-operated mobile part MT, when the latter is introduced into the battery-charging unit ALE for charging a battery AK in the mobile part MT. The holder again features the charging contacts LK1-B, LK2-B in the area where the charging of the mobile part battery is to take place. The charging contacts LK1-B, LK2-B are connected to base station BS via the switch S-B, which can be opened and closed again by the charge switch LS-B in the base station BS. By the mobile part MT now being inserted into the battery-charging unit ALE the charging contacts LK1-M, LK2-M assigned to the mobile part MT are connected to the charging contacts LK1-B, LK2-B assigned to the base station BS. The charging contacts LK1-M, LK2-M are again connected to mobile part MT via the switch S-M, which can be opened and then closed again by the charge switch LS-M in the mobile part MT. The battery AK in the mobile part MT is again charged by the power adapter NG.

The battery AK again supplies all the consumer boards of the mobile part MT with energy or current. These boards again include, as well as the charge switch LS-M, the control device SE-M with the monitoring means ÜWM, checking means ÜPM and the confirmation signal detection means BSEM, the radio part FT-M with the antenna AT-M, the memory SP-M, The display device AV, the timer ZM-M and the keypad TA.

To supply current or energy, the base station BS, unlike mobile part MT, is again fed by the ac power adapter NG. The power adapter NG supplies all the consumer boards of the base station BS with energy or current. These boards again include, in addition to the charge switch LS-B, the control device SE-M with the comparator VG, the radio part FT-B with the antenna AT-B, the memory SP-B and timer ZM-B.

Signaling from mobile part MT to base station BS is, in accordance with FIG. 3, preferably achieved by the switch unit LS-M, S-M and the control device SE-M, that form the signal creation means for creating a signal SI interrupting the connection between the mobile part MT and base the station BS via the charging contacts LK1-M, LK2-M, LK1-B, LK2-B at least once by opening the switch S-M and establishing it again by closing the switch S-M. In accordance with FIG. 6 in signal trace diagram section III the period t1–t2 for the first opening is preferably 500 ms, The period of t2–t3 for the first closing is preferably 100 ms, The period t3–t4 for the second opening is preferably 300 ms, the period t4–t5 for the second closing is preferably 200 ms, The period t5–t6 for the third opening is preferably 100 ms, before at point t6 the switch S-M is closed for the last time.

The signaling of the base station BS to the mobile part MT is in accordance with FIG. 4 preferably achieved by the switching device LS-B, S-B and the control device SE-M that form the signal creation means, to create a confirmation signal BSI, interrupting the connection between the mobile part MT and base station BS via the charging contacts LK1-M, LK2M, LK1-B, LK2-B at least once by opening the switch S-B establishing it again by closing the switch S-B. In accordance with FIG. 7 the period t1–t2 for the first opening is preferably 500 ms, The period t2–t3 for the first closing is preferably 500 ms and the period t3–t4 for the second opening is preferably 500 ms, before at point t4 the switch S-B is closed for the last time. After the mobile part MT has detected the confirmation signal BSI with the means for detecting the confirmation signal BSEM, the registration procedure is started by the control device SE-M, this is shown in FIG. 5 by the registration data AD passing over the air interface.

The normal registration procedure via the air interface begins with a specific initial registration PIN.

On registration the mobile part will be assigned the next free internal number. If all internal numbers are allocated, the mobile part with the internal number "INT6" is always overwritten. The RFPI number that is now entered makes a further automatic registration from the mobile part side no longer possible.

The automatic registration takes around 40 seconds overall. Users do not need to make any entries of their own, such as entering a PIN to register their mobile part. The unique assignment between mobile part <-> base station in manufacturing no longer applies since all unregistered devices can be combined with one another.

FIG. 5, compared to FIG. 4, shows the basic block diagram of the cordless telecommunications system for wireless telecommunications consisting of the battery-operated mobile part MT and the base station BS with the battery-charging unit ALE, in which the establishment of the ready-to-register state has basically been completed and for which, in an optional fifth step the situation in which two mobile parts can cross register at two base station is to be avoided.

The battery-charging unit ALE again consists of the holder for the battery-operated mobile part MT, when the latter is introduced into the battery-charging unit ALE for charging a battery AK in the mobile part MT. The holder again features the charging contacts LK1-B, LK2-B in the area where the charging of the mobile part battery is to take place. The charging contacts LK1-B, LK2-B are connected to base station BS via the switch S-B, which can be opened and closed again by the charge switch LS-B in the base station BS. By the mobile part MT now being inserted into the battery-charging unit ALE the charging contacts LK1-M, LK2-M assigned to the mobile part MT are connected to the charging contacts LK1-B, LK2-B assigned to the base station BS. The charging contacts LK1-M, LK2-M are again connected to mobile part MT via the switch S-M, which can be opened and then closed again by the charge switch LS-M in the mobile part MT. The battery AK in the mobile part MT is again charged by the power adapter NG.

The battery AK again supplies all the consumer boards of the mobile part MT with energy or current. These boards again include, as well as the charge switch LS-M, the control device SE-M with the monitoring means ÜWM, checking means ÜPM and the confirmation signal detection means BSEM, the radio part FT-M with the antenna AT-M, the memory SP-M, The display device AV, the timer ZM-M and the keypad TA.

To supply current or energy, the base station BS, unlike mobile part MT, is again fed by the ac power adapter NG. The power adapter NG supplies all the consumer boards of the base station BS with energy or current. These boards again include, in addition to the charge switch LS-B, the control device SE-M with the comparator VG, the radio part FT-B with the antenna AT-B, the memory SP-B and the timer ZM-B.

Avoiding crossed registration is achieved in that initially, in accordance with FIG. 4, with the transmission of a confirmation signal BSI the base station BS triggers the timer ZM-M, ZM-B to measure the interval between a starting point and an end point and creation of a time stamp ZS-M, ZS-B in each case for the measured interval both in the base station BS and also in the mobile part MT. Because of the delay time of the trigger signal via the charging contacts the result can be that the timers ZM-M, ZM-B in the base station BS and in the mobile part MT are started at different times and stopped at different times.

After the timer ZM-M in the mobile part MT has been stopped, the time stamp ZS-M created by timer ZM-M of mobile part MT is sent over the air interface from mobile part MT to base station BS. In the base station BS this transmitted time stamp ZS-M of the mobile part MT is compared with the time stamp ZS-B of the base station BS in the comparator VG in which case, if the two time stamps ZS-M, ZS-B differ from one another by at least a prespecified value, the mobile part MT is not registered at the base station BS.

The invention claimed is:

1. A method for registering battery-operated mobile parts at a base station comprising a battery-charging unit, comprising:
   establishing a ready-to-register state between the mobile part to be registered and base station;
   executing a registration procedure via wireless communication, wherein prespecified registration data comprising base station, mobile part, system and product-specific identifications, are transmitted between the registering mobile part and the base station;
   storing the registration data;
   establishing the readiness to register by performing the steps of
   (a) introducing the mobile part to be registered into a battery-charging unit of the base station, wherein the mobile part becomes connected to the base station via charging contacts;
   (b) performing trickle-charging to a battery of the mobile part to be registered for a predetermined time;
   (c) checking in the mobile part to be registered whether registration data is stored in the mobile part, in which case the process of establishing the ready-to-register state continues if no registration data is stored, or is aborted if data is already stored;
   (d) transferring from the mobile part to be registered to the base station a signal via the charging contacts, wherein the signal notifies the base station of the ready-to-register state on the mobile part side;
   (e) detecting the signal at the base station and transmitting a conformation signal from the base station to the mobile part via the charging contact to confirm to the mobile part the receipt of the signal and notifies the base station side ready-to-register status; and
   (f) detecting the confirmation signal at the mobile part to be registered wherein the detection of the confirmation signal initiates a registration procedure.

2. The method according to claim 1, wherein the transmission of the confirmation signal initiates a timer at the base station to measure an interval between a start point and an end point for creation of a time stamp in each case for the measured interval both in the base station and the mobile part.

3. The method according to claim 2, wherein the initiation of the timer in the base station and in the mobile part begins at different starting points and stopped at different ending points.

4. The method according to claim 3, wherein after the stopping of the timer in the mobile part, the time stamp created by the timer of the mobile part is transmitted from the mobile part to the base station and wherein the base station compares the transmitted time stamp with the time stamp of the base station, and, if the two time stamps differ by at least a prespecified value, there is no registration of the mobile part at the base station.

5. The method according to claim 1, wherein the signal is generated by the connection between the mobile part and base station via the charging contacts being opened and then closed again at least once by the mobile part.

6. The method according to claim 1, wherein the confirmation signal is generated by the connection between the mobile part and base station via the charging contacts being opened and then closed again at least once by the base station.

7. The method according to claim 1, wherein the mobile part to be registered records an actual value of a charge current which flows in the connection between the mobile part and the base station via the charging contacts, and, if this actual value is less than a specified required value of the charge current, it interrupts the establishment of the ready-to-register state until such time as the actual value is equal to or greater than the required value.

8. The method according to claim 1, wherein the mobile part to be registered monitors whether the mobile part was operated by the user before it was inserted into the battery-charging unit and whether the display is not in an idle state and, if this is the case, does not begin to establish the ready-to-register state.

9. A system, comprising:
  a battery-operated mobile part comprising charging contacts;
  a base station comprising a battery-charging unit, a memory and charging contacts, wherein the mobile part establishes a ready-to-register state with the base station, and a registration procedure is executed via wireless communication, wherein prespecified registration data comprising base station, mobile part, system and product-specific identifications, are transmitted and stored in the memory of the base station,
  and wherein the ready to register mobile part and base station establish a readiness to register,
    (a) wherein the mobile part to be registered is connected into the battery-charging unit of the base station via the charging contacts;
    (b) wherein the base station comprises means for performing trickle-charging to a battery of the mobile part to be registered for a predetermined time;
    (c) wherein the mobile part to be registered comprises checking means to check whether registration data is stored in the mobile part, in which case the process of establishing the ready-to-register state continues if no registration data is stored, or is aborted if data is already stored;
    (d) wherein the mobile part to be registered comprises signal means for transferring to the base station a signal via the charging contacts, wherein the signal notifies the base station of the ready-to-register state on the mobile part side;
    (e) wherein the base station comprises detecting means for detecting the signal and transmits a conformation signal to the mobile part via charging contact to confirm receipt of the signal and notifies the base station side ready-to-register status; and
    (f) wherein the mobile part to be registered detects the confirmation signal and initiates a registration procedure.

10. The system according to claim 9, further comprising a timer in the mobile part that measures the interval between a start point and an end point and creates a time stamp for the measured interval, which is triggered by the base station with the transmission of the confirmation signal together with a further timer in the base station.

11. The system according to claim 10, wherein the mobile part timer is connected to a control device, a radio part and an antenna in such a way that after the timer is stopped, the time stamp created by the timer of the mobile part will be used for a comparison with a further time stamp which is created by the further timer in the base station, in which case, if the two time stamps differ by at least prespecified value from one another, there is no registration of the mobile part at the base station.

12. The system according to claim 10, wherein the signal means comprises a switch device and a control device connected to each other in such a way that for creation of the signal the connection between the mobile part and the base station via the charging contacts is interrupted and established again at least once.

13. The system according to claim 12, wherein the control device is designed in such a way that via a charge switch of the switch device an actual value of a charge current that flows in the connection between the mobile part and the base station via the charging contacts is recorded and, if this actual value is less than a specified required value of the charge current the establishment of the ready-to-register state is interrupted until such time as the actual value is equal to or greater than the required value.

14. The system according to claim 13, wherein the control device comprises monitoring means that monitors whether the mobile part, before it is introduced into the battery-charging unit has been operated via a keypad and the display is not in the idle state and with the control device, a functional unit is formed so that when the display is not in the idle state, the establishment of the ready-to-register state is not started.

15. A telecommunications system for wireless telecommunications, comprising at least one base station having a battery-charging unit and at least one battery-operated mobile part, wherein the base station and the mobile part can establish a ready-to-register state and with which, when the mobile part and the base station are ready to register, the mobile part can be registered at the base station in a registration procedure by wireless telecommunications, in which case prespecified registration data comprising base station, mobile part, system and product-specific identifications are transmitted between the mobile part and base station and stored in a memory, wherein, to establish the ready-to-register state, said system comprises:
  (a) charging contacts in the mobile part that are inserted into the battery-charging unit which comprises further charging contacts;
  (b) a switch device in the mobile part to be registered allows trickle charging for a predetermined period of time;
  (c) means for checking a memory in the mobile part to be registered whether registration data is stored in the memory, wherein the checking means are assigned to a control device that establishes the ready-to-register process proceeds if no registration data is stored, otherwise the process for establishing the ready-to-register state is aborted;
  (d) means for creating a signal in the mobile part to be registered which are connected to the charging contacts and are designed in such as way that a signal is created and transferred to the base station to notify the base station that the mobile part side is ready to register;
  (e) means for creating of a confirmation signal in the base station that reconnected to the charging contacts and are designed in such a way that a conformation signal is created and transmitted to the mobile part via charging contact to confirm to the mobile part the receipt of the signal and to notify it of the ready-to-register state on the base station side;
  (f) means to detect a confirmation signal in the mobile part to be registered that detect the confirmation signal and which are assigned to the control device and form a functional unit with this in such a way that, when the confirmation signal is detected, the registration procedure is started.

16. The telecommunications system according to claim 15, further comprising timers, one timer in the mobile part and one timer in the base station wherein the timers measure an interval between a start time and an end time and for creating time stamps, and where a time stamp created in the base station and of a time stamp created in the mobile part for the measured interval, which are triggered by the base station with the transmission of the confirmation signal.

17. The telecommunications system according to claim 16, wherein the timer in the mobile part is connected to the control device, a radio part and a antenna of the mobile part in such a way that, after the mobile part timer is stopped, the time stamp created by the timer of the mobile part is transmitted to the base station and a comparator is available in the base station that compares the time stamp transferred by the mobile part with the time stamp created by the timer in the base station and is assigned to a control device in the base station and with this forms a functional unit in such a way that, when the two time stamp differ from each other by at least a prespecified value, the mobile part is not registered at the base station (BS).

18. The telecommunications system according to claim 15, wherein the signal creation means comprises a switch device and control device that are connected to each other in such a way that for creation of the signal, the connection between the mobile part and the base station via the charging contacts is interrupted and established again at least once.

19. The telecommunications system according to claim 15, wherein the confirmation signal creation means comprises a switch device in the base station and a control device in the base station connected to each other in such a way that for creation of the confirmation signal the connection between the mobile part and base station via the charging contacts of the base station is interrupted and established again at least once.

20. The telecommunications system according to claim 15, wherein the control device in the mobile part to be registered is designed in such a way that via a charge switch of the switch device an actual value of a charging current that flows in the connection between the mobile part and the base station via the charging contacts is recorded and, if this actual value is smaller than a prespecified required value of the charging current the establishment of the ready-to-register state is interrupted until such time as the recorded actual value is equal to or greater than the required value.

21. The telecommunications system according to claim 15, wherein the control device in the mobile part to be registered features monitoring means that monitor whether the mobile part, before it is inserted into the battery-charging unit, is being operated via a keypad by the user and the display is not in the idle state, and together with the control device, forms a functional unit in such a way that, when the display is not in the idle state the establishment of the ready-to-register state is not started.

* * * * *